United States Patent [19]

Rye et al.

[11] Patent Number: 5,265,660
[45] Date of Patent: Nov. 30, 1993

[54] TIRE CONSTRUCTION COMBINING THE TOEGUARD AND INNER LINER

[75] Inventors: Grover W. Rye, Cuyahoga Falls; Joseph E. Lipovac, Copley, both of Ohio

[73] Assignee: The Goodyear Tire & Rubber Company, Akron, Ohio

[21] Appl. No.: 728,409

[22] Filed: Jul. 11, 1991

[51] Int. Cl.$^5$ .................................. B60L 15/06
[52] U.S. Cl. ........................... 152/510; 152/543
[58] Field of Search ............ 152/510, 543, 547, 513, 152/458, DIG. 9, DIG. 16; 156/110.1, 121, 123, 130, 133, 130.7, 135, 405.1, 406.4

[56] References Cited

U.S. PATENT DOCUMENTS

| | | | |
|---|---|---|---|
| 2,937,684 | 5/1960 | Rockoff | 152/543 |
| 3,013,599 | 12/1961 | Riggs | 152/543 |
| 3,254,694 | 6/1966 | Sparks et al. | 152/543 |
| 4,029,138 | 6/1977 | Kresta | 152/543 |
| 4,776,909 | 10/1988 | Bohm et al. | 156/123 |
| 4,877,468 | 10/1989 | Siegenthaler | 156/133 |
| 5,062,462 | 11/1991 | Rye et al. | 156/134 |

Primary Examiner—Geoffrey L. Knable
Attorney, Agent, or Firm—David E. Wheeler

[57] ABSTRACT

A new tire construction and method which makes the toe guard integral with the inner liner is provided. A tire is made using an inner liner that has a width substantially equal to the width of a prior art inner liner plus the width of prior art toe guards minus any overlap. The edges of the inner liner, which wrap around the bead, are reinforced so that the edges of the inner liner protect the bead area of the tire against damage caused by the rim or the mounting and dismounting procedure.

2 Claims, 3 Drawing Sheets

TIRE CONSTRUCTION COMBINING THE TOEGUARD AND INNER LINER

BACKGROUND OF THE INVENTION

This invention relates to a pneumatic tire and a method of making a pneumatic tire.

It is conventional in the art to build a pneumatic tire having an inner liner comprised of a rubber (usually halobutyl) which has low air permeability in order to help maintain tire inflation and to prevent gases from migrating into the carcass plies and belt plies of the tire. In general, because of the purpose for which it is used, rubber used as an inner liner is soft and has a relatively low tear strength and modulus compared to other types of rubber used in a tire. Accordingly, in the prior art, inner liner rubber was limited to use in non-stress areas of the inner tire between the tire beads.

In the conventional building of the tire, toe guards are placed in an overlapping position on the inner liner prior to application of the carcass plies, and are folded over the beads together with the carcass plies to provide a tough, tear resistant material over the outside of the beads and the carcass plies for contact with the rim. Toe guards conventionally comprise a bias fabric which is coated and impermeated with a tough, tear resistant rubber compound. The bias cut of the fabric permits expansion of the material when it is wrapped around the tire bead in the construction of a tire. Providing tough, tear resistant toe guards protects the tire in the rim area during mounting and dismounting and helps prevent leaks from developing around the rim.

Providing toe guards in this manner has the disadvantages that: additional compounding is required for a separate composition for the toe guard; additional application steps are required to apply the toe guard in an overlapping relationship on the edges of the inner liner; and the toe guard, because of its gauge, may permit air to be trapped between the inner liner, and the carcass plies. Also, since the inner liner does not extend over the beads, air permeability in this region of the tire may be greater than that observed for the rest of the tire.

It is an object of the present invention to provide a method of building a tire and a tire made thereby in which the toe guards and inner liner are together in one substantially integral structure. Using such a structure reduces the number of building steps required, and accordingly reduces the expense of building a tire, while maintaining superior physical properties.

Other objects of the invention will be apparent from the following description and claims.

SUMMARY OF THE INVENTION

A pneumatic tire is provided having an inner liner of sufficient width such that the inner liner extends over and is wrapped around the bead of the tire in the tire building process. Said inner liner has a reinforced portion in an area proximal to said beads and wrapped around said beads. The reinforced portion of the inner liner has adequate stiffness to prevent green gum distortion across the inner liner when it is wrapped around the tire beads, and has sufficient strength to prevent tire damage in the bead area of the tire during mounting and dismounting. The reinforced portion of the inner liner may be fiber loaded rubber or a spun bonded synthetic material applied to the edges of the inner liner.

Also provided is a method of building a tire comprising the steps of laying down an inner liner with reinforced edges and a length sufficient to wrap around the tire beads on a tire building drum during the tire building process, applying carcass plies over the inner liner, disposing at least a pair of tire beads over the carcass plies, and folding the edges of the carcass ply and the inner liner over said beads. The carcass is then expanded and the tire is then completed by adding optional additional reinforcing structure, tread rubber and sidewall rubber, and vulcanizing the completed tire structure. The reinforced portion of the inner liner may comprise either fiber loaded rubber stock or an additional layer of spun bonded synthetic material.

Also provided is an inner liner for a pneumatic tire construction, said inner liner having a width sufficient to wrap around tire beads in said tire construction, and said inner liner having reinforced edges.

The method provides a pneumatic tire which does not require separate toe guards, has a stronger construction, better air loss characteristics, and is easier to build requiring fewer manipulative steps.

DETAILED DESCRIPTION OF THE INVENTION

Figure 1:
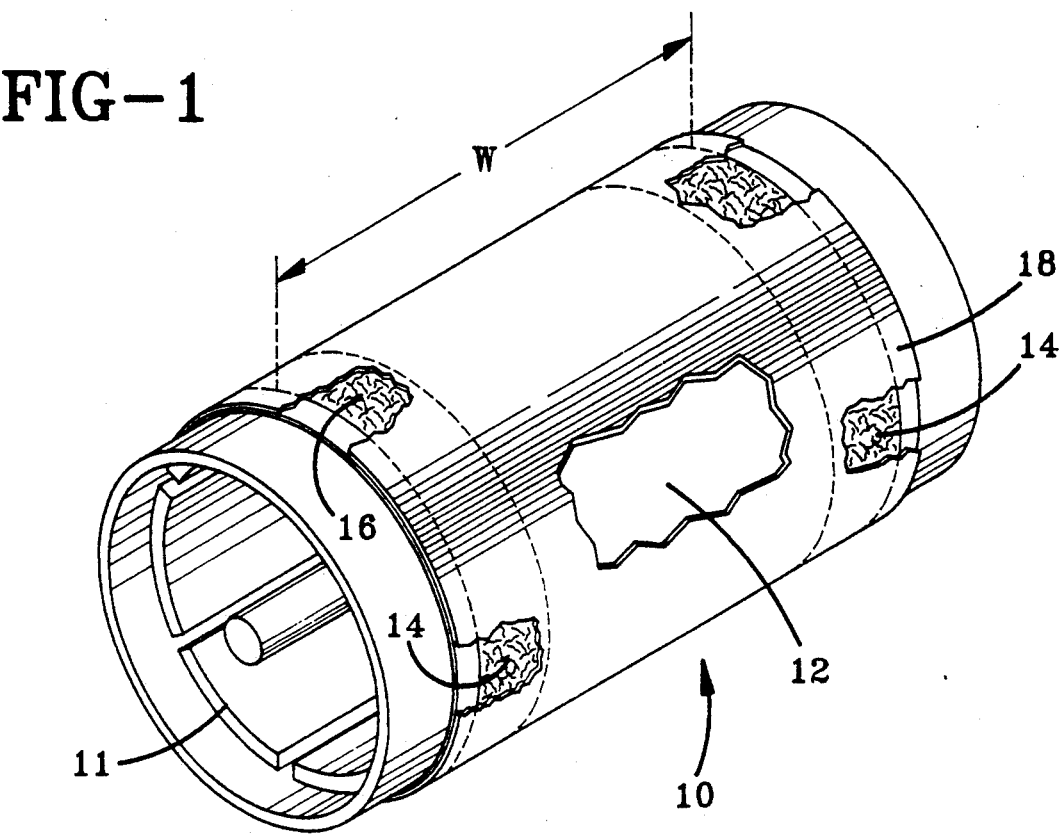
FIG. 1 illustrates an inner liner of the invention with fiber reinforced edges and at least one carcass ply disposed on a tire building drum.

With reference now to FIG. 1, as a first step in a tire construction 10 of the invention, an inner liner having a width W is disposed on a tire building drum 11. In the illustrated embodiment of FIG. 1, inner liner 12 has reinforced portions (edges) 14 containing a fibrous reinforcement material (fibers) 16. After disposition of inner liner 12 on tire building drum 11, carcass plies 18 are disposed thereover as is conventional in the art. Width W is sufficient for reinforcement portions 14 of inner liner 12 to wrap around tire beads 15 in a completed tire construction (see FIG. 7).

Those skilled in the art will recognize that it is desirable that fibers be loaded only on the edges of inner liner 12 since fibers interfere with the expansion of the inner liner. A thin gauge fiber loaded strip may be calendered onto the edges of the inner liner (compare with FIG. 6) or the inner liner may be made in a manner wherein the fibers are incorporated into the edge of the liner as it is made.

In the preferred embodiment the reinforced portions will be loaded with 3 phr to 9 phr, preferably about 6 phr of fiber reinforcement selected from the group comprising, aramid, nylon, polyester, glass, rayon, cotton and mixtures thereof. The fibers may be in fully oriented form or in the form of partially oriented yarn (POY fibers).

Figure 2:
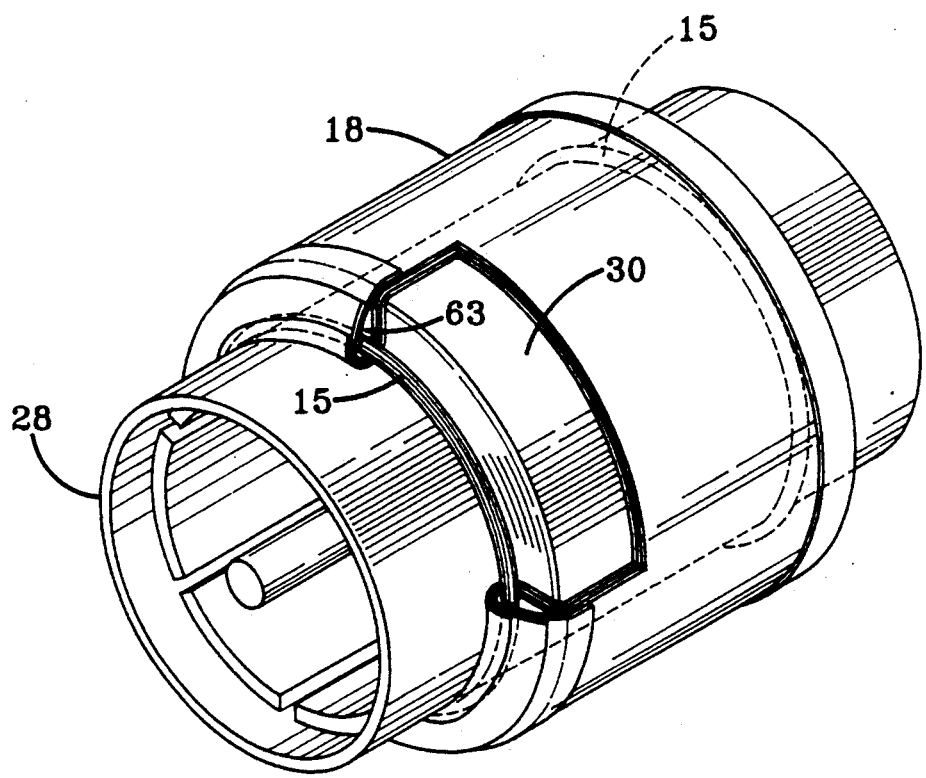
FIG. 2 illustrates the first expansion step of a tire construction where the inner liner and carcass have been wrapped over the tire beads and the edges thereof have been turned up over the tire beads.

With reference now to FIG. 2, after bead rings 15 are added to the tire building drum 11, the drum is activated to expand the bladder 30 (see FIG. 3) and to expand the carcass and provide a seat for bead rings 15, bead rings 15 are moved into place and locked in position, apex rubber 63 is applied over the beads, and turn up bladder 28 (FIG. 3) is activated to turn up carcass plies 18 and inner liner 12 around bead rings 15.

Sidewall rubber can be added and the tire carcass shaped as is conventional in the art. The tread rubber and optional belts or breakers and chafers may then be added to the construction, and the entire construction can then be vulcanized.

Those skilled in the art will recognize that the method of the invention may be used to build small tires, such as wheel barrow tires, that do not require belt or breaker reinforcement.

Figure 3:
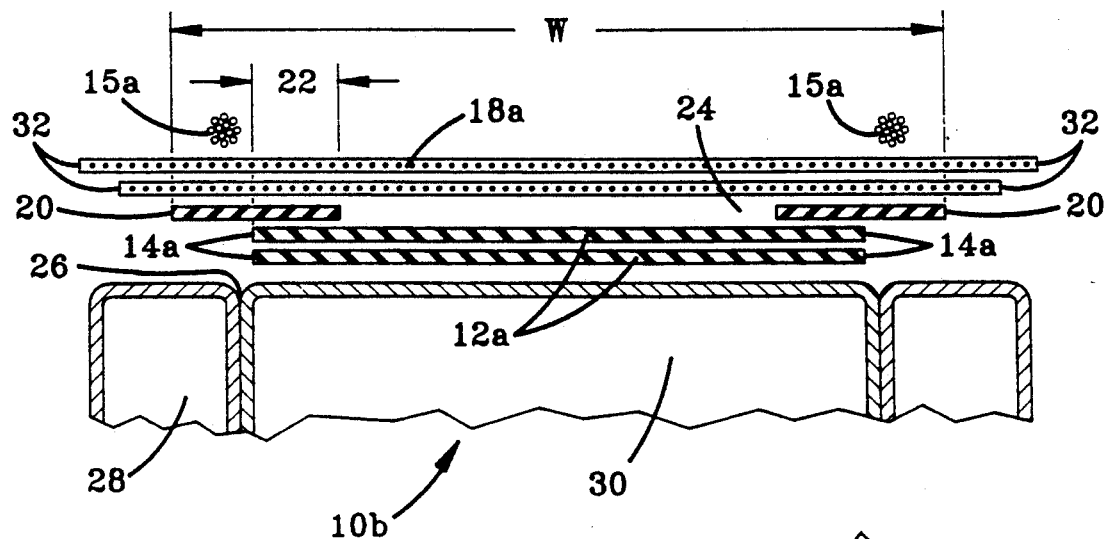
FIG. 3 illustrates an exploded view of a cross section of a prior art inner liner, toe guards, carcass plies and beads mounted on a tire building drum.
Figure 4:
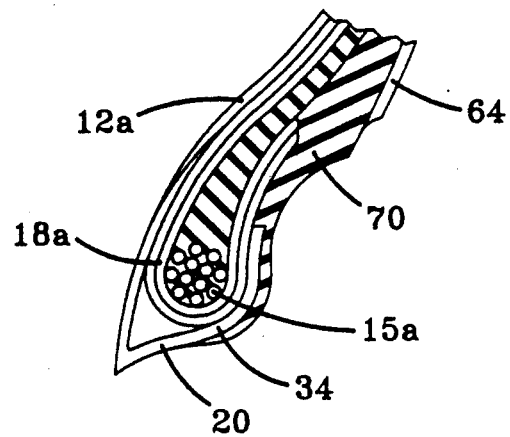
FIG. 4 illustrates the bead area of a completed prior art tire construction employing toe guards.
Figure 5:
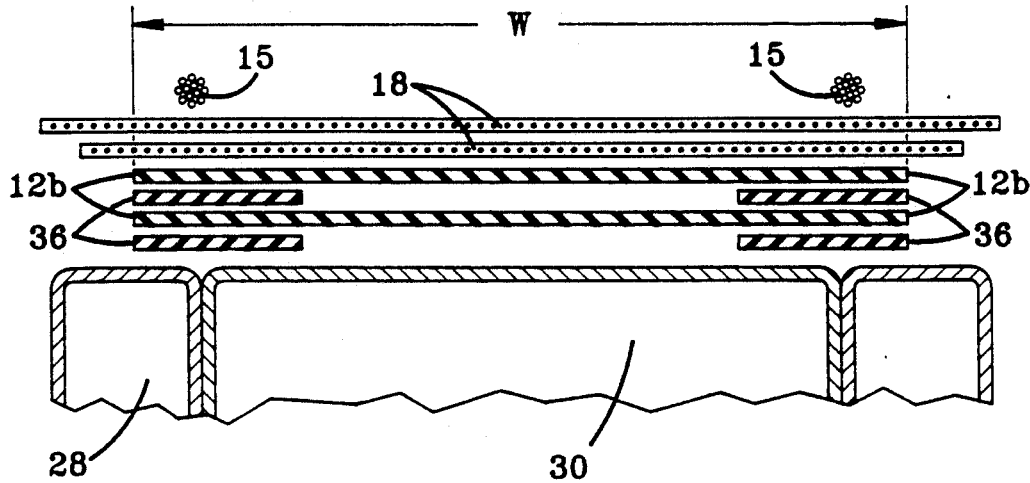
FIG. 5 illustrates an exploded view of a cross section of a part of a tire construction in which the inner liner of the invention has edges reinforced with a spun bonded synthetic material.

With reference now to FIGS. 3 and 5, width W is determined based on prior art tire construction 10b, and is equivalent to the width of a prior art inner liner 12a plus the width of toe guards 20 minus any overlap. In the prior art, toe guards 20 overlap the edges 14a of inner liner 12a and provide strength in the bead area of prior art tire constructions.

Those skilled in the art will recognize that the prior art toe guard undergoes a certain amount of expansion during the turn-up operation in the building of a tire, and this expansion may also be considered when calculating the width of the inner liner of the present invention.

As can be seen in FIG. 3, in the prior art construction, because of the gauge of toe guard 20 (typically about 0.059 inch) and the overlap 22 between the toe guard 20 and the inner liner 12a, there is a potential for trapping air in space 24 in the construction of a tire which would tend to cause a blister or a curing blow during vulcanization.

Also, gap 26 between turn up bladder 28 and expansion bladder 30 is an area into which green rubber can be trapped during tire construction, which can cause distortion or damage to the bead area of the green tire.

Using the method of the invention, the above delineated prior art problems can be substantially avoided. The reinforced edges 14 of the inner liner 12 substantially eliminate trapping of rubber in gap 26 and consequent tearing or distortion, and because the inner liner is prepared in one piece, no air gaps are created because there is no overlap splice between the toe guard and the inner liner. Similarly, the reinforced edge of the inner liner has substantial stability which controls stretching of the liner during application to the drum and makes possible a more uniform application. The reinforced edges of the toe guard prevent stretching of the liner material during processing and building and accordingly the rubber of the inner liner retains better elongation properties than would be possible for the halobutyl rubber without the reinforced edge, and prevents shrinkage of the inner liner during vulcanization, which would tend to cause the inner liner to pull away from the carcass plies.

Since the kind of toe guard reinforcement used in the present invention does not exhibit a significant reduction in width on expansion of the tire, the toe guard portion of the inner liner has a width less than the toe guard in the prior art. Also, in the illustrated embodiment, the width is calculated so that the toe guard portion of the inner liner of the invention does not project above the bead to avoid its presence in a flex zone of the tire.

Figures 6, 7:
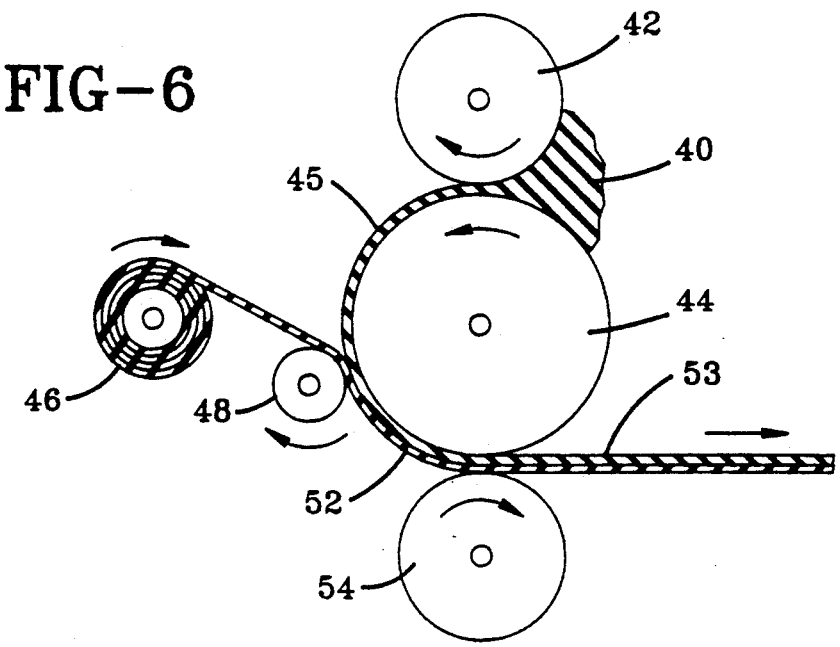
FIG. 6 illustrates apparatus which may be used to apply reinforcing material to the edges of calendered inner liner stock rubber.
FIG. 7 illustrates a cutaway view of a pneumatic tire of the invention in which the inner liner wraps around the tire beads.

With reference now to FIG. 5, in a preferred embodiment of the invention, an inner liner 12b of width W is provided in which reinforced portion 14b is replaced by a strip of spun bonded synthetic material 36 which can be applied to each edge of the inner liner 12b as it is formed on the calendar using an apparatus of the kind illustrated in FIG. 6.

Preferably, the spun bonded material has a low gauge, about 0.002 to 0.010 inch, preferably 0.0025 to 0.005 inch and does not create a large gap between the inner liner and the carcass plies. Also, the preferred spun bonded material has an open network of fibers that permits strike through of rubber that makes the thickness of the spun bonded material seem even lower.

Those skilled in the art will recognize that a thin gauge woven material, having properties and strike through characteristics similar to the spun bonded material, can also be used in the method.

It is preferred that the woven or spun bonded material has expansion characteristics sufficient to match or exceed the expansion that the toe guard undergoes during turn up and during the expansion step in the building of the tire.

With reference now to FIG. 6, stock halobutyl rubber (preferably chlorobutyl rubber) may be placed in a feed bank 40 in the crease between top roller 42 and main roller 44 and flattened by the action of the rollers and trimmed to size to provide flattened rubber stock 45 as is conventional in the art. Two feed rolls 46 of spun bonded synthetic material (for example Cerex ®, available from James River Corporation, Pensacola, Fla.) may be disposed in conjunction with the two edges of the flattened stock rubber and stitched to the rubber using pressure roller 48 to provide stock reinforced liner material 52. The stock material 52 can be further calendered using roll 54 as is conventional in the art to provide tire building stock 53. The stock 53 is cut to the lengths needed for building a tire, usually at the tire building drum.

In the preferred embodiment, the Cerex ® material has an average breaking load of 1.0 to 8.0 pounds, preferably 1.0 to 4.0 pounds, as measured by ASTM No. D-1682-6407.01, and an average load of 1 to 6 pounds, preferably 1 to 3 pounds at 26% elongation, and an ultimate elongation of 20% to 70%, preferably 40% to 70%.

In order to ensure the desired air impermeability provided by an inner liner, it is conventional in the art to wrap the inner liner around a tire building drum twice. Accordingly, with reference to FIG. 5, there will be two layers of reinforcing material (Cerex ® in the illustrated embodiment of FIG. 5) at each edge of the inner liner separated by a layer of the inner liner.

This arrangement has the advantage, especially where a spun bonded synthetic material is used for reinforcement, that there is limited stretch during application, making it easier to more accurately determine the amount of material needed, and assuring uniformity in properties. The toe guard liner is easier to handle in the building process since it has increased stiffness and decreased tack. Also, since the inner liner extends below the bead, the tire demonstrates better air retention than prior art tires.

It is desirable that the reinforcing material not restrict the expansion of the inner liner as it is stretched over the tire beads. The desired characteristics of a spun bonded reinforcing material, and the measured properties of an exemplary material are described in copending U.S. application Ser. No. 07/467,715, now U.S. Pat. No. 5,062,462 issued Nov. 5, 1991 incorporated herein by reference.

With reference now to FIG. 7, in a completed tire construction 60 of the invention, inner liner 12b and carcass plies 18 are wrapped around tire beads 15 wherein reinforced portion 36 of inner liner 12b covers carcass plies 18 on the turn up portion 62 of carcass plies 18. Accordingly, reinforced portion 36 is on the outer surface of the tire construction, exposed to the tire rim, and provides strength to a mounted tire in the rim area.

Sidewall 64 and tread rubber 66, and optional belts or breakers 68 and chafers 70 complete the tire construction as is conventional in the art.

The tire of the invention requires fewer manufacturing steps because the toe guard rubber strips do not have to be compounded, bias cut and applied, and increases tire building efficiency by eliminating a separate application step. Also, scrap is reduced by minimizing liner blisters. It has been found that a tire made according to the invention has improved air loss properties and surprisingly has better mold release properties than conventional tire constructions.

While specific embodiments of the invention have been illustrated and described, those skilled in the art will recognize that the invention can be variously modified and practiced without departing from the spirit thereof. The invention is limited only by the following claims.

What is claimed is:

1. A pneumatic tire having at least one pair of beads, at least one carcass ply wrapped around said at least one pair of beads, a halobutyl inner liner disposed inwardly of said carcass ply, tread rubber disposed over said carcass ply in a crown region of said tire and sidewall rubber disposed between said tread rubber and a bead of said at least one pair of beads, said inner liner having a width W such that said inner liner continuously extends over and is wrapped around each bead of said pair of beads, and wherein said inner liner comprises a reinforced portion in an area proximal to said bead and wrapped around said bead and adapted to contact a rim on which said tire is to be mounted thereby protecting a bead area of said tire, and wherein the reinforced portion of said inner liner is made by applying spun bonded material having a thickness of 0.002 to 0.010 inch to an edge portion of said inner liner to form said reinforced portion, said material having an open network of fibers that permits strike through of rubber, said material having expansion characteristics sufficient to match or exceed the expansion that a toeguard undergoes during a turnup step and an expansion step in the building of a tire.

2. The tire of claim 1 in which said material has an average break load of 1 to 8 pounds as measured by ASTM No. D-1682-6407.01 and an average load of 1 to 6 pounds at 26% elongation and an ultimate elongation of 20% to 70%.

* * * * *